(12) United States Patent
Hall et al.

(10) Patent No.: US 10,669,139 B2
(45) Date of Patent: Jun. 2, 2020

(54) RACK AND CHAIN LIFTING DEVICE

(71) Applicants: David R. Hall, Provo, UT (US);
Jackson Priddis, Orem, UT (US);
Andrew Priddis, Mapleton, UT (US);
Eimi Priddis, Mapleton, UT (US)

(72) Inventors: David R. Hall, Provo, UT (US);
Jackson Priddis, Orem, UT (US);
Andrew Priddis, Mapleton, UT (US);
Eimi Priddis, Mapleton, UT (US)

(73) Assignee: Halls Labs LLC, Provo, UT (US)

( * ) Notice: Subject to any disclaimer, the term of this patent is extended or adjusted under 35 U.S.C. 154(b) by 361 days.

(21) Appl. No.: 15/181,907

(22) Filed: Jun. 14, 2016

(65) Prior Publication Data

US 2017/0355578 A1  Dec. 14, 2017

(51) Int. Cl.
| | |
|---|---|
| *F16G 13/04* | (2006.01) |
| *F16H 7/06* | (2006.01) |
| *B66F 3/02* | (2006.01) |
| *F16G 13/08* | (2006.01) |
| *F16G 13/06* | (2006.01) |
| *F16H 19/06* | (2006.01) |

(52) U.S. Cl.
CPC .............. *B66F 3/02* (2013.01); *F16G 13/04* (2013.01); *F16H 7/06* (2013.01); *F16G 13/06* (2013.01); *F16G 13/08* (2013.01); *F16H 19/06* (2013.01)

(58) Field of Classification Search
CPC .. F16H 19/06; F16H 2019/0613; F16H 19/04; F16H 7/06; Y10T 74/1884; Y10T 74/1967; Y10T 74/18152; F16G 13/04; F16G 13/06; F16G 13/08; B66F 3/02

USPC .............. 74/422, 89.21, 37, 665 GE, 189.2; 474/213, 212
See application file for complete search history.

(56) References Cited

U.S. PATENT DOCUMENTS 3,850,043 A * 11/1974 Tarbox ................... B23Q 1/621
                                                          33/1 M
5,452,774 A *  9/1995 Davis ....................... B66B 9/16
                                                          187/270
(Continued)

FOREIGN PATENT DOCUMENTS

| EP | 1566568 A2 * | 2/2005 |
|---|---|---|
| GB | 111976 A * | 12/1917 |

(Continued)

OTHER PUBLICATIONS

Aventics Inverted Tooth Chains Drive (REXROTH) (Year: 2014).*

*Primary Examiner* — Monica S Carter
*Assistant Examiner* — Mahdi H Nejad

(57) ABSTRACT

The invention is a rack and chain lifting device. The purpose is to convert rotational motion to linear motion in a way that is superior to a rack and pinion device because, first, it allows for more points of contact with the rack through the use of a silent chain in place of a pinion, and, second, because it can be used in corners since the motor can be distanced from the rack by means of the silent chain. The invention comprises a silent chain with link plates that are shaped such that the teeth of the link plates are offset when the chain is straightened, allowing the profile of the silent chain to correspond with the profiles of both gears and racks. The invention also comprises a rack that can be placed in corners. Some embodiments include a system of gears, a motor, and a mounting platform.

18 Claims, 18 Drawing Sheets

(56) References Cited

U.S. PATENT DOCUMENTS

| | | | | |
|---|---|---|---|---|
| 5,924,338 | A * | 7/1999 | Peck | B67B 7/0441 81/3.29 |
| 5,967,926 | A * | 10/1999 | Kozakura | F16H 7/06 474/206 |
| 5,989,140 | A * | 11/1999 | Ichikawa | F16H 7/06 474/148 |
| 6,168,543 | B1 * | 1/2001 | Matsuda | F16G 13/04 474/157 |
| 6,705,962 | B2 * | 3/2004 | Schinzel | B23Q 5/385 474/101 |
| 6,868,747 | B2 * | 3/2005 | Goser | F16H 19/06 198/833 |
| 7,628,266 | B2 * | 12/2009 | Reist | B65G 7/04 198/779 |
| 7,789,783 | B2 * | 9/2010 | Young | F16H 7/06 474/212 |
| 9,494,213 | B2 * | 11/2016 | Motoshima | F16G 13/04 |
| 2004/0138020 | A1 * | 7/2004 | Meyer | B65G 17/40 474/206 |
| 2006/0199691 | A1 * | 9/2006 | Matsui | F16G 13/04 474/212 |
| 2007/0186706 | A1 * | 8/2007 | Aaron | F16H 55/26 74/422 |
| 2007/0275804 | A1 * | 11/2007 | Morimoto | F16G 13/04 474/213 |
| 2009/0036245 | A1 * | 2/2009 | Ogo | F16G 13/04 474/212 |
| 2009/0054187 | A1 * | 2/2009 | Pflug | F16G 13/04 474/141 |
| 2010/0222170 | A1 * | 9/2010 | Yasuta | F16G 13/04 474/140 |
| 2011/0230289 | A1 * | 9/2011 | Schuseil | F16G 13/04 474/206 |
| 2014/0045632 | A1 * | 2/2014 | Sasaki | F16G 13/04 474/212 |
| 2015/0141183 | A1 * | 5/2015 | Cowen | F16G 13/04 474/157 |
| 2015/0211603 | A1 * | 7/2015 | Koschig | F16G 13/04 474/229 |
| 2017/0350472 | A1 * | 12/2017 | Hall | F16G 13/06 |
| 2017/0363186 | A1 * | 12/2017 | Hall | B66B 11/0045 |
| 2017/0369283 | A1 * | 12/2017 | Hall | B66B 9/022 |
| 2018/0100561 | A1 * | 4/2018 | Fujishima | F16G 13/04 |

FOREIGN PATENT DOCUMENTS

| | | | | |
|---|---|---|---|---|
| WO | WO_2014100907 | * | 7/2014 | |
| WO | WO2014100907 | * | 7/2014 | |
| WO | WO-2014100907 A1 | * | 7/2014 | B61B 13/02 |

* cited by examiner

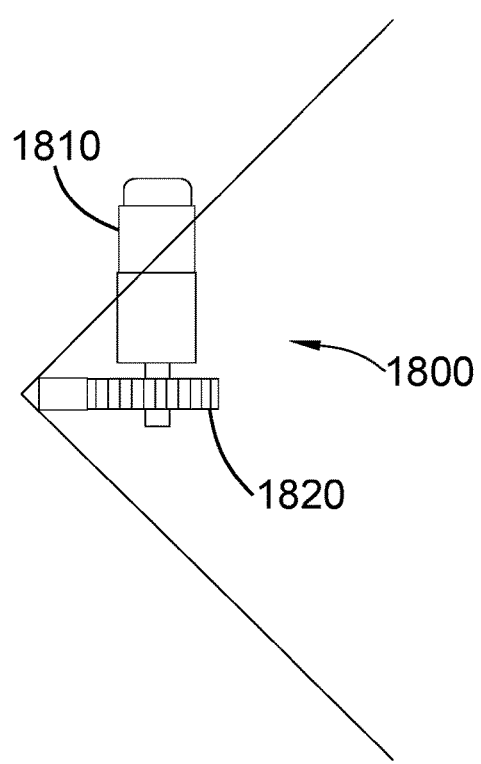
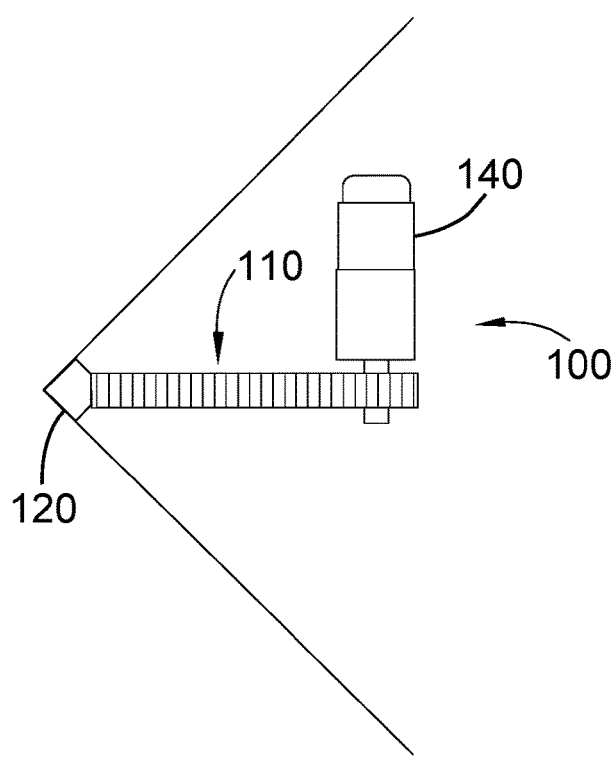
FIG. 18A
FIG. 18B

RACK AND CHAIN LIFTING DEVICE

CROSS-REFERENCES

TECHNICAL FIELD

This invention relates generally to the field of lifting devices, and more specifically to a rack and chain lifting device used for linear motion.

BACKGROUND

The lifting capacity of an average person amounts to not more than a few hundred pounds. For this reason, people have turned for centuries to mechanical means of lifting heavy items. Some of the means devised include pulley systems, cranes, scissor lifts, or linear actuators. One type of linear actuator of particular interest here is a rack and pinion device.

Rack and pinion devices are configured to convert rotational motion to linear motion. They are often used for creating horizontal linear motion, such as in transport, packaging, and assembly machines, but rack and pinion devices can also be used for vertical linear motion. However, when lifting heavy items vertically, rack and pinion devices have some disadvantages. First, rack and pinion devices normally have only a few points of contact between the rack and the pinion. If a rack and a pinion have contact at only a few points, those points of contact may be put under disproportionate amounts of stress when lifting, which could cause the rack and pinion device to fail. In contraptions in which reliability or safety are significant concerns, such as in an elevator, taking chances with parts that might break under load could lead to disastrous results. This problem is sometimes solved by increasing the size and, therefore, the load capacity of the rack and pinion, but larger parts are harder to manufacture, require more space, cost more, and might require larger motors, all of which lead to decreased efficiency, which is especially undesirable if trying to create a green or sustainable product. One further issue with rack and pinion devices is that these devices generally are not placed in corners. That is because the motor extending out from the pinion is generally too large to fit in the space available within the angle of the corner. This limits the versatility of the devices.

In light of the foregoing, what is needed is a rack and pinion device in which the number of points of contact between the rack and pinion is increased. Also, a device is needed in which the motor can be distanced from the rack, so that the devices can be placed in corners. This could conceivably be accomplished through the use of a silent chain in place of a pinion. Silent chains, like pinions, are generally built for rotational motion. However, if the rotational motion of a silent chain could be converted to linear motion, because of the length of a silent chain, numerous points of contact between a silent chain and a rack could be established, rather than the few points of contact established between a pinion and a rack. In addition, a silent chain would allow a motor to be distanced from the rack, as far away as the length of the silent chain would allow. This would enable racks to be placed and utilized in corners. Unfortunately, the profile of a typical silent chain is built to engage only with a sprocket, not with a rack. Therefore, a silent chain with a profile that would allow it to engage with both a circular sprocket and a linear rack is needed. Finally, a rack that can be placed in corners is needed as well.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow for lifting using a silent chain that engages with a rack, increasing points of contact with the rack and allowing the rack to be placed in corners.

Consistent with the foregoing, a rack and chain lifting device is disclosed. The rack and chain lifting device comprises a silent chain and a rack. The silent chain comprises a plurality of connecting pins and a plurality of link plates. The link plates each have at least four teeth and two pin holes. The link plates are stacked in alternating rows and bendably joined together by inserting the connecting pins through the pin holes. In some embodiments, the connecting pins are rocker pins. The teeth of the link plates are shaped in such a way that the teeth of a first row selection of link plates and the teeth of a second row selection of link plates are offset when the silent chain is straightened, such that a profile of the silent chain corresponds with gear and rack profiles. In some embodiments, the silent chain also comprises center guide link plates. The center guide link plates, which are stadium-shaped and have no teeth, are positioned centrally between the rows of link plates to prevent the silent chain from slipping.

The rack has a profile that corresponds to the profile of the silent chain. In one embodiment, the rack has a truncated cubic configuration. One front face has teeth, and parallel to the front face is a point where two back faces join at a ninety-degree angle, such that the rack can be placed in a corner. In some embodiments, the rack has a center guide indentation that corresponds with the center guide link plates of the silent chain, to prevent the silent chain from slipping when it engages with the rack.

In some embodiments, the rack and chain lifting device also comprises a plurality of gears, which have profiles that correspond to the profile of the silent chain; a motor, which is connected to and drives the gears and the silent chain; and a mounting platform, on which the motor and the gears are mounted, connecting the rack and chain lifting device to an item to be lifted.

BRIEF DESCRIPTION OF THE DRAWINGS

A more particular description of the invention briefly described above is made below by reference to specific embodiments depicted in drawings included with this application, in which:

FIG. 18 depicts a perspective view of a comparison between a rack and pinion device in a corner and the rack and chain lifting device in a corner.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
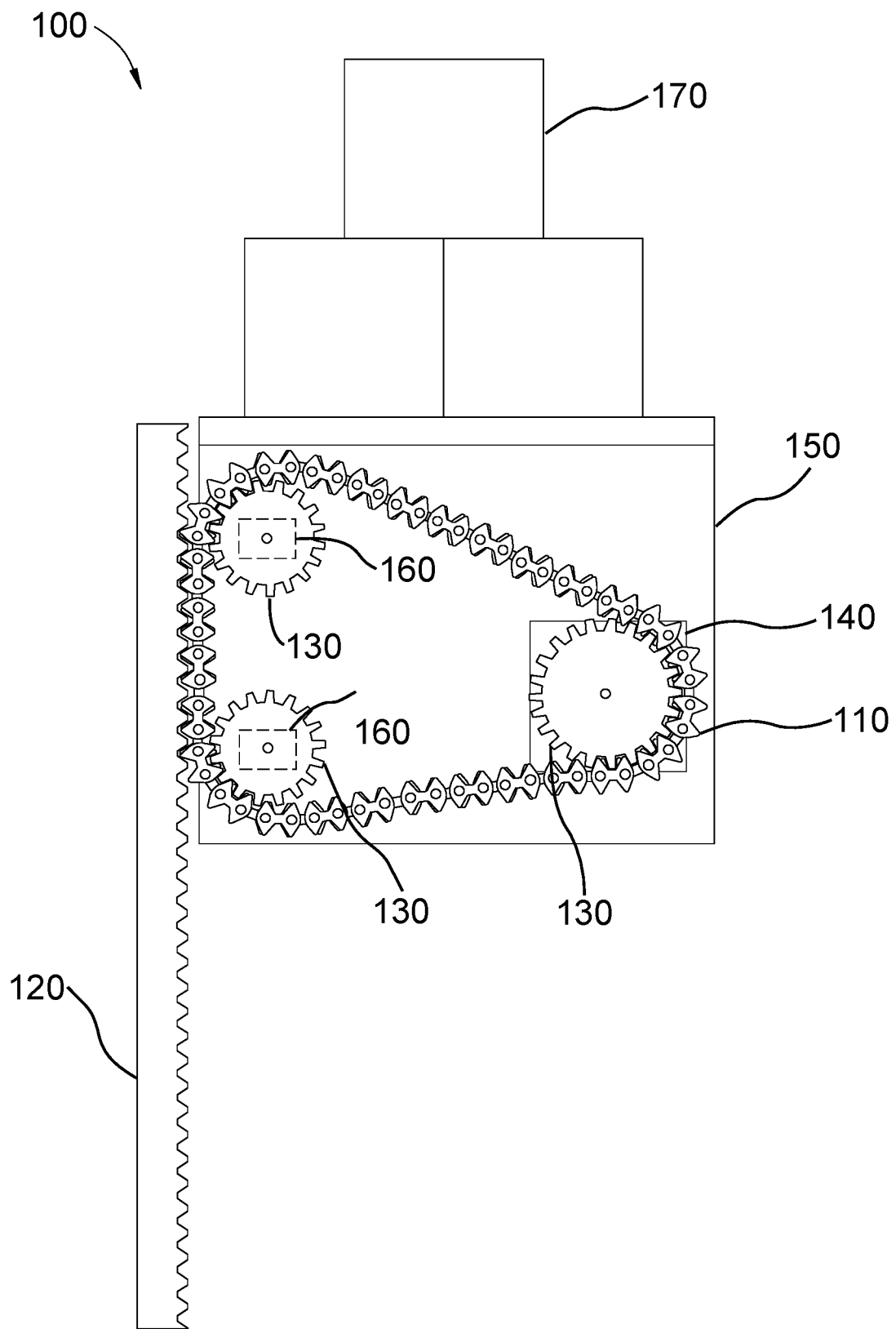
FIG. 1 depicts the rack and chain lifting device engaged in lifting.

FIG. 1 depicts one embodiment of the rack and chain lifting device 100 engaged in lifting. The rack and chain lifting device 100 comprises a silent chain 110. A profile of the silent chain 110 corresponds with gear and rack profiles. A rack is a linear gear interface and a gear is a sprocket. The rack and chain lifting device 100 further comprises a rack 120. In some embodiments, the rack and chain lifting device also comprises a plurality of gears 130, a motor 140, and a mounting platform 150. In one embodiment, a plurality of tensioners 160 are used to make the silent chain 110 taut. The rack 120 and the gears 130 have profiles that correspond to the profile of the silent chain 110. The motor 140 is connected to and drives the gears 130 and the silent chain 110. The motor 140 and the gears 130 are mounted on the mounting platform 150, connecting the rack and chain lifting device 100 to an item to be lifted. FIG. 1 depicts the rack and chain lifting device 100 functioning to lift items 170.

The silent chain 110 comprises a plurality of connecting pins and a plurality of link plates. The link plates have at least four teeth and two pin holes. The link plates are stacked in alternating rows and bendably joined together by inserting the connecting pins through the pin holes. The teeth of the link plates are shaped in such a way that the teeth of a first row selection of link plates and the teeth of a second row selection of link plates are offset when the silent chain is straightened, such that the profile of the silent chain corresponds with gear and rack profiles. The following several images depict the structure of the silent chain 110 in more detail.

Figure 2:
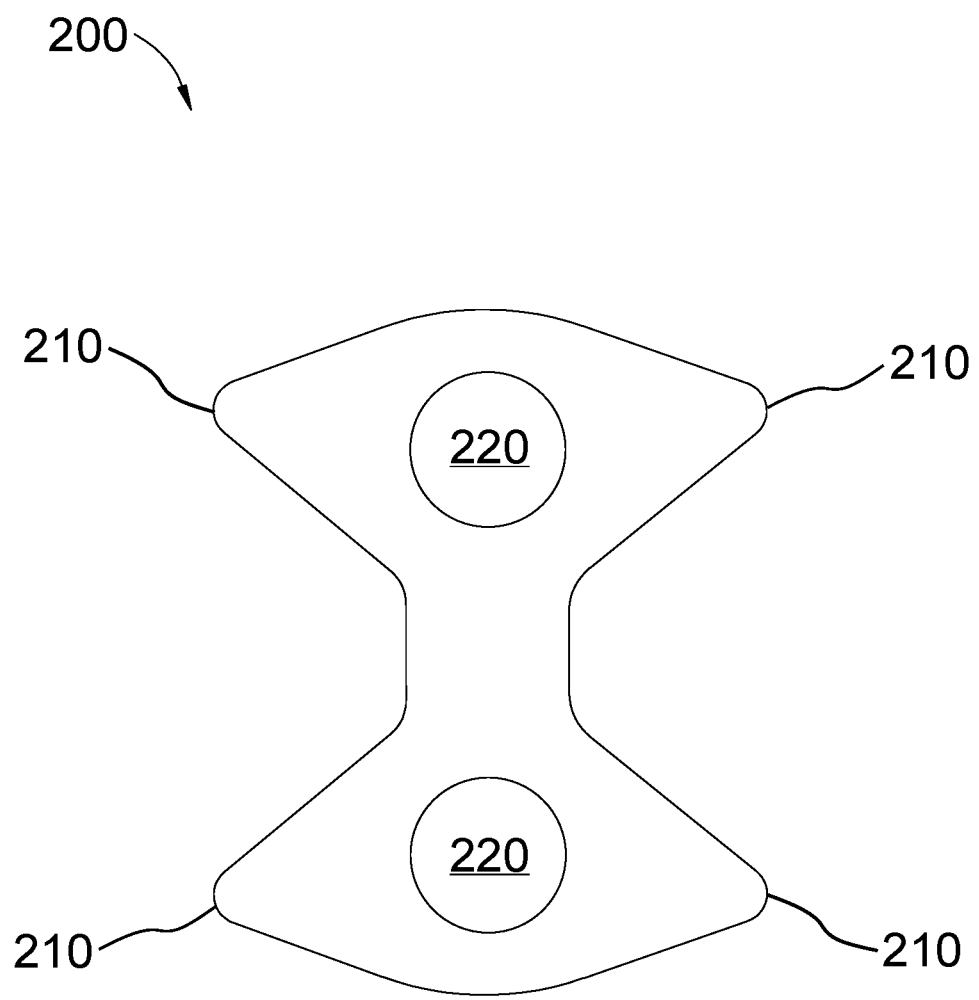
FIG. 2 depicts an exploded view of the link plates of the silent chain.

FIG. 2 depicts one embodiment of a single link plate 200 of the silent chain 110. Each link plate 200 has at least four teeth 210 and two pin holes 220. In one embodiment, the link plates are bow-shaped. A tip of each of the teeth 210 of the link plates 200 forms an angle between about thirty and eighty degrees, preferably an angle between about fifty-five and sixty degrees. Each of the teeth 210 of the link plates 200 extends from a vertical waist 230 of each link plate 200 at an angle between about one hundred and one hundred fifty degrees, preferably an angle of between about one hundred twenty-five and one hundred thirty degrees. A distance between central pivot points within each pin hole of the link plates 200 measures 0.5 inches. A distance between central points of two teeth 210 that are pointing a same direction measures between about 0.345 and 0.79 inches, preferably measuring between about 0.49 and 0.68 inches, more preferably measuring between about 0.55 and 0.645 inches. These measurements make it so that the teeth 210 of the link plates 200 are shaped in such a way that, when the link plates 200 are stacked in alternating rows, the teeth of a first row selection of link plates and a second row selection of link plates are offset. When the resulting silent chain is straightened, the profile of the silent chain corresponds with gear and rack profiles.

Figure 3A:
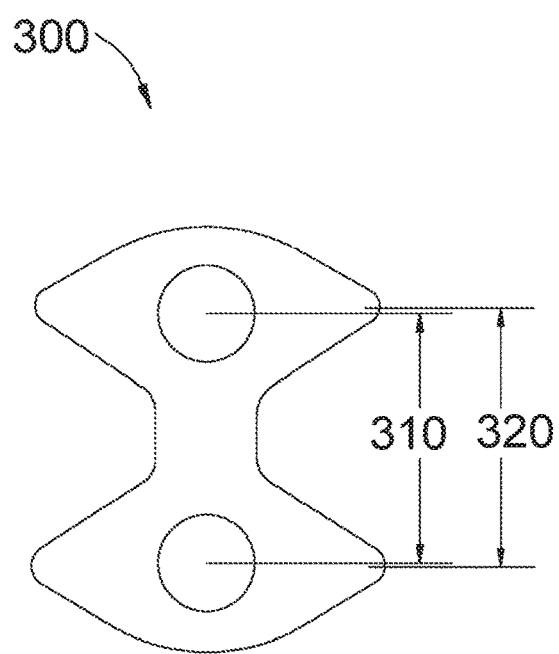
FIG. 3 depicts an exploded view of a comparison between link plates of a prior art silent chain and the link plates of the silent chain.
Figure 3B:
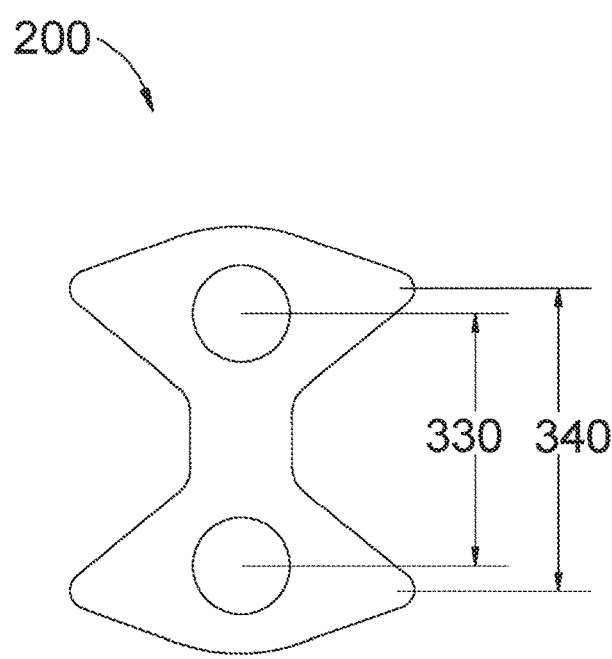

FIG. 3 depicts a comparison between a link plate 300 of a prior art silent chain and link plate 200 of the silent chain 110 of the invention. FIG. 3A depicts one embodiment of a link plate 300 of a prior art silent chain. There are two important measurements of note on link plate 300. A distance 310 between central pivot points within each pin hole measures about 0.5 inches. A distance 320 between central points of two teeth and pointing a same direction measures about 0.52 inches. The difference between these two measurements is very small. Therefore, when two or more of these link plates 300 of a prior art silent chain are stacked on top of each other in a straight line, the teeth of each link plate nearly align. FIG. 3B depicts one embodiment of the link plate 200 of the silent chain 110 of the invention. Again, a distance 330 between central pivot points within each pin hole measures about 0.5 inches. The distance 340 between central points of two teeth pointing the same direction measures between about 0.345 and 0.79 inches, preferably measuring between about 0.49 and 0.68 inches, more preferably measuring between about 0.55 and 0.645 inches. The difference between these two measurements is larger than the difference between the two corresponding measurements of the link plate 300 of a prior art silent chain. Therefore, when the link plates 200 are stacked in alternating rows, the teeth of a first row selection of link plates 200 and the teeth of a second row selection of link plates 200 are offset. When the resulting silent chain is straightened, the profile of the silent chain corresponds with gear and rack profiles.

Figure 4A:
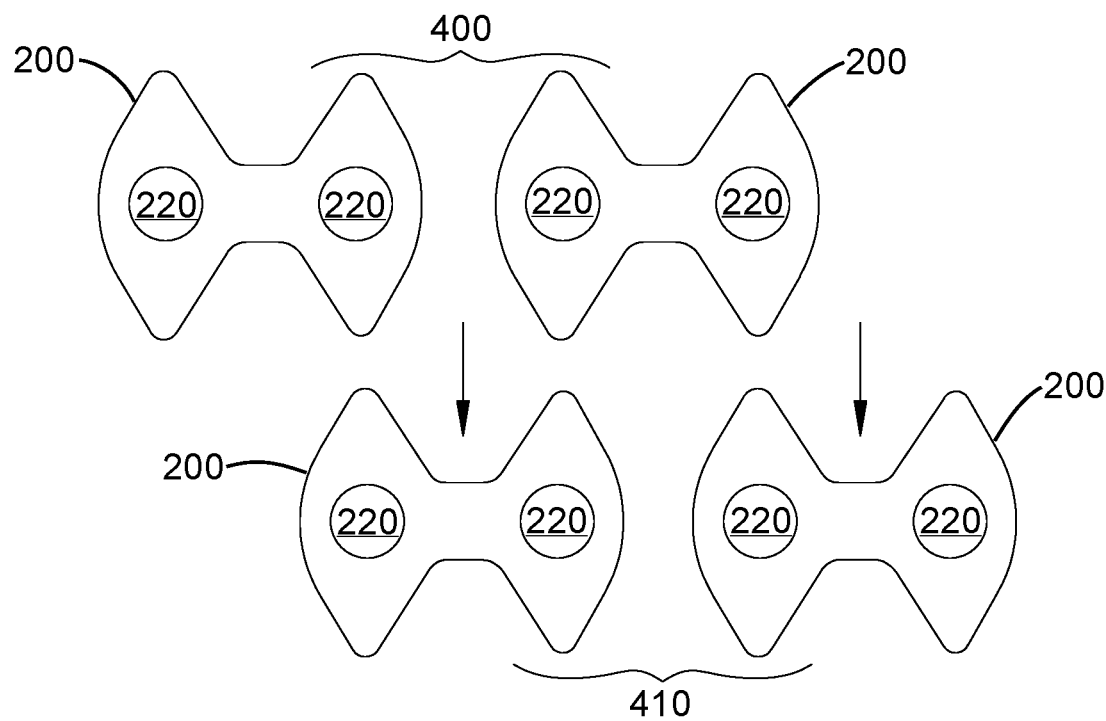
FIG. 4 depicts an exploded view of the link plates of the silent chain stacked in alternating rows.
Figure 4B:
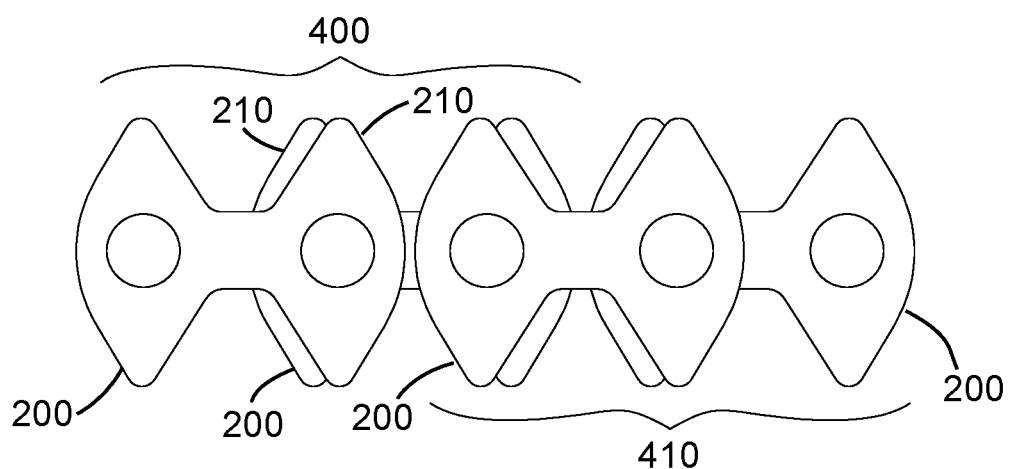

FIG. 4 depicts one embodiment of the link plates 200 of the silent chain of the invention stacked in alternating rows. In FIG. 4A, the pin holes 220 of a first row selection 400 of link plates 200 are aligned with the pin holes 220 of a second row selection 410 of link plates 200. In FIG. 4B, the link plates 200 are stacked on top of each other. As depicted in FIG. 4B, the teeth 210 of the link plates 200 are shaped in such a way that the teeth 210 of the first row selection 400 of link plates 200 and the teeth 210 of the second row selection 410 of link plates 200 are offset when the silent chain is straightened. Though the teeth are offset when the silent chain is straightened, the upper portion of the teeth align when the silent chain is bent. This allows the profile of the silent chain to correspond with a profile of a rack and also with a profile of a gear. In one embodiment, the silent chain has eight alternating rows of link plates. A large number of alternating rows makes the silent chain stronger. In other embodiments, the silent chain has any number of alternating rows of link plates.

Figure 5B:
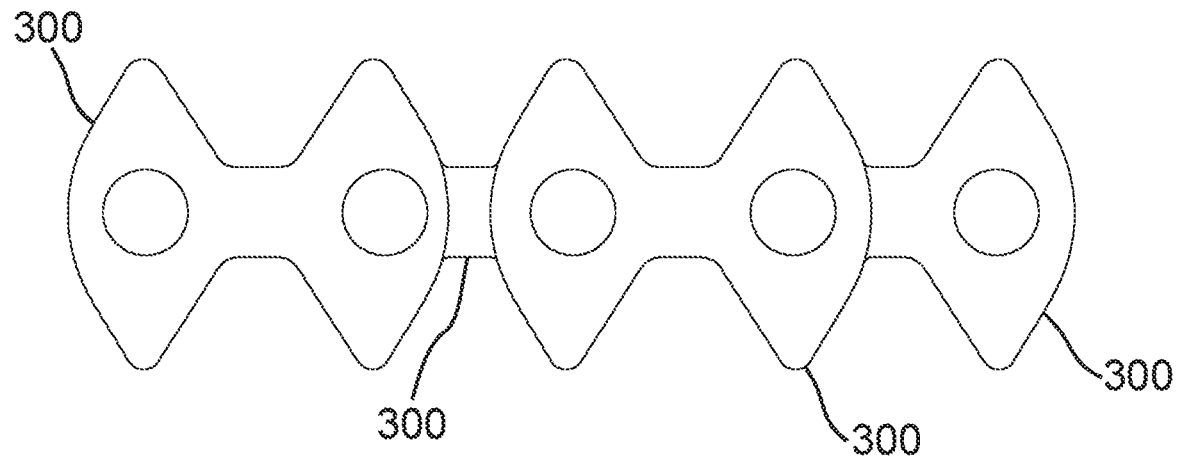
FIG. 5 depicts an exploded view of a comparison of link plates stacked in alternating rows in a prior art silent chain and the link plates stacked in alternating rows in the silent chain.
Figure 5B:
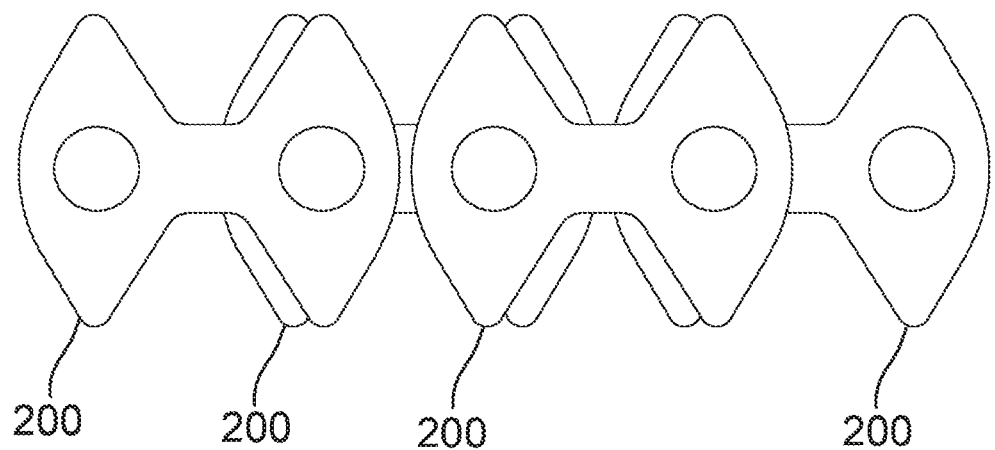

FIG. 5 depicts a comparison of the link plates 300 of one embodiment of a prior art silent chain stacked in alternating rows and the link plates 200 of one embodiment of the silent chain of the invention stacked in alternating rows. FIG. 5A depicts the link plates 300 of a prior art silent chain stacked in alternating rows. When the link plates 300 are stacked on top of each other in a straight line, the teeth of each link plate 300 nearly align. FIG. 5B depicts the link plates 200 of the silent chain of the invention stacked in alternating rows. When the link plates 200 are stacked on top of each other in a straight line, the teeth of each link plate are offset.

Figure 6:
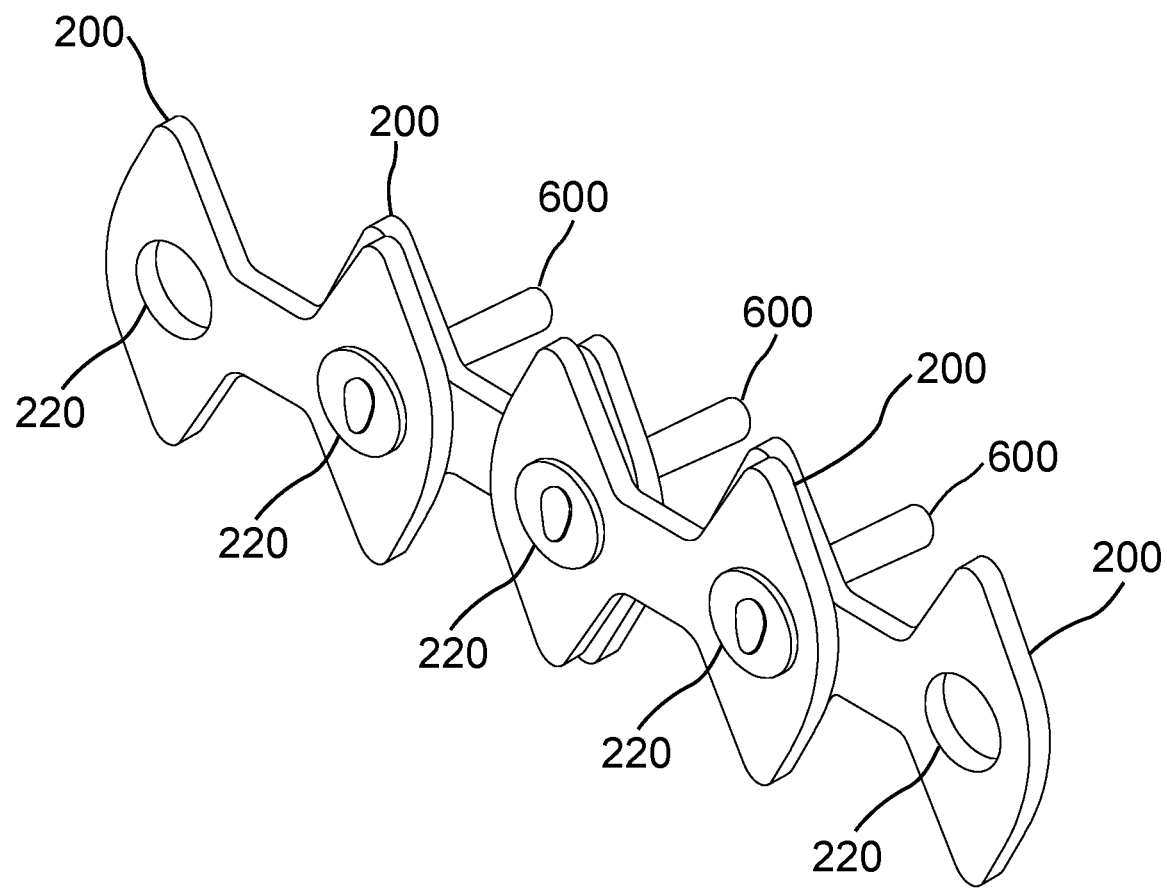
FIG. 6 depicts an exploded view of the connecting pins inserted through the pin holes of the link plates of the silent chain.

FIG. 6 depicts a plurality of connecting pins 600 inserted through the pin holes 220 of the link plates 200 of the silent chain of the invention. The link plates 200 are bendably joined together by inserting the connecting pins 600 through the pin holes 220. In one embodiment, the connecting pins are rocker pins. In one embodiment, the pins are secured with washers. The washers are placed over top and bottom ends of the connecting pins 600, and the ends of the connecting pins 600 are smashed down to hold the connecting pins 600 in place. FIG. 6 depicts only two alternating rows of link plates 200. In one embodiment, however, the silent chain has eight alternating rows of link plates. In other embodiments, the silent chain has any number of alternating rows of link plates.

Figure 7:
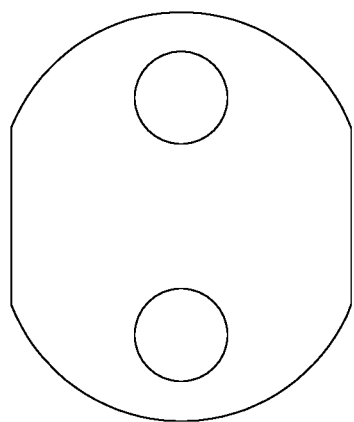
FIG. 7 depicts an exploded view of the center guide link plates.

FIG. 7 depicts one embodiment of center guide link plate 700. Center guide link plates 700 are stadium-shaped and have no teeth. Center guide link plates 700 are positioned centrally between the rows of link plates. They are designed to correspond with center guide indentations on the rack, to prevent the silent chain from slipping when it engages with the rack.

Figure 8B:
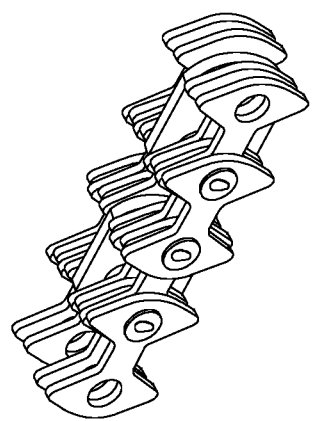
FIG. 8 depicts a perspective view of the silent chain.
Figure 8A:
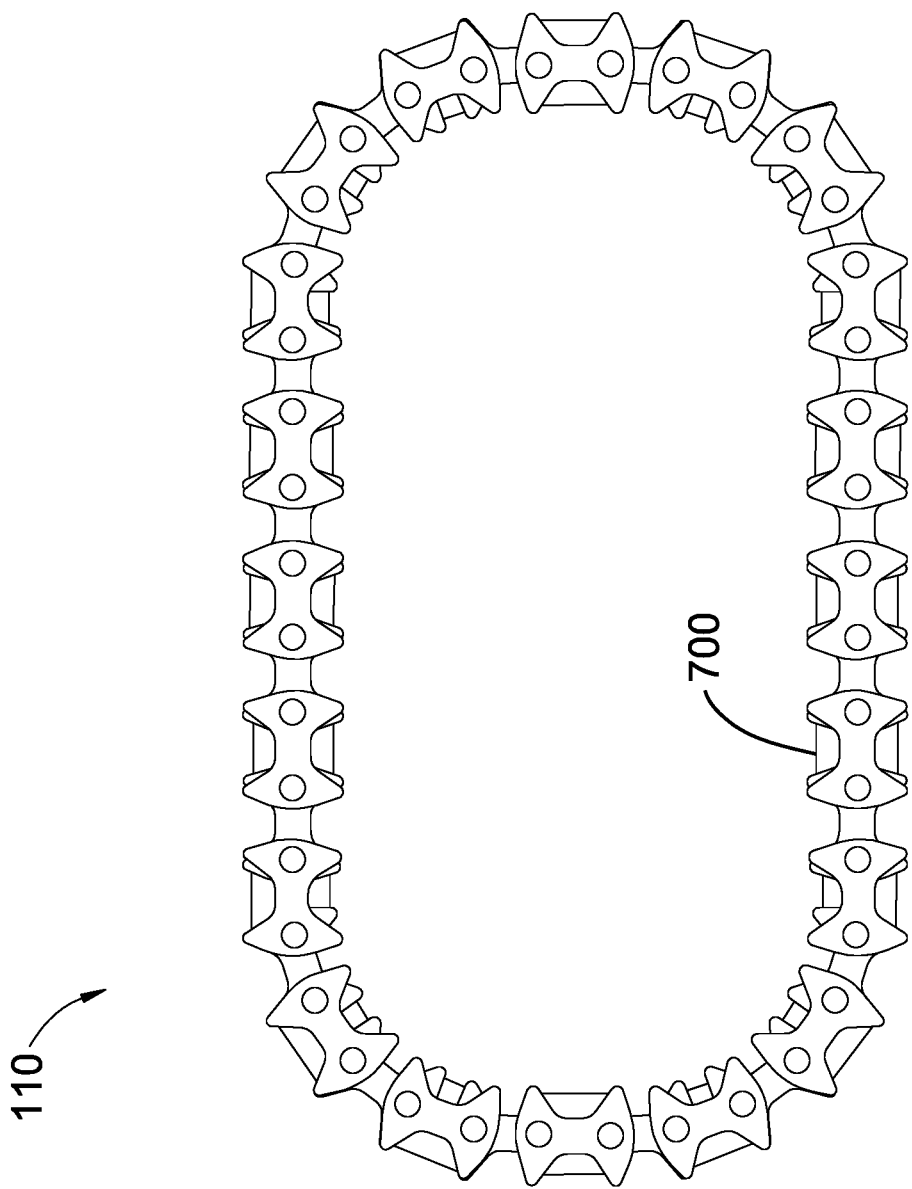

FIG. 8 depicts one embodiment of the silent chain 110 of the invention. The chain has a variable length and a variable amount of alternating link plates. FIG. 8A depicts one embodiment, in which the center guide link plates 700 can be seen centrally positioned between alternating rows of link plates. FIG. 8B depicts a side view of one embodiment of silent chain 110. In this embodiment, there are eight alternating rows of link plates, plus center guide link plates. In other embodiments, the silent chain has any number of alternating rows of link plates.

Figure 9A:
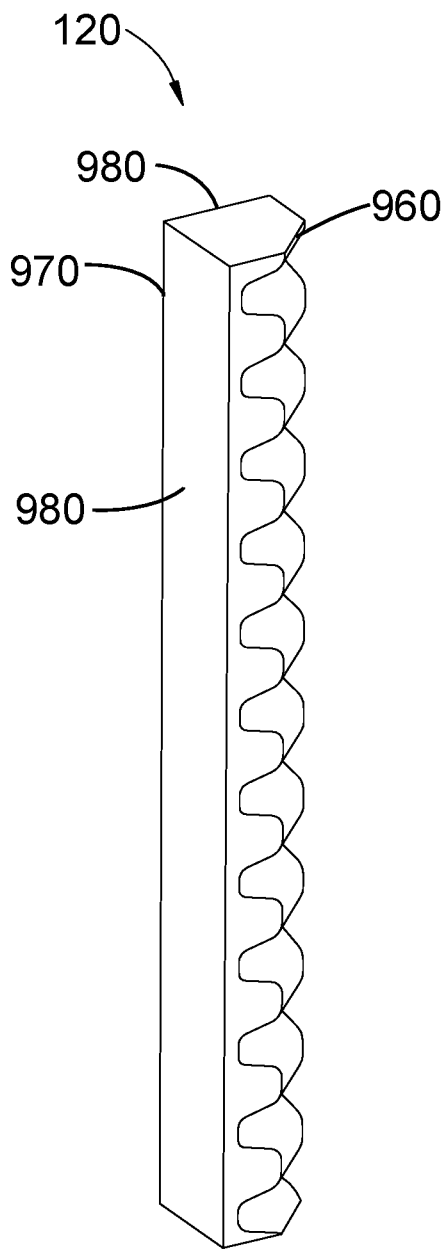
FIG. 9 depicts a perspective view of embodiments of the rack.
Figure 9B:
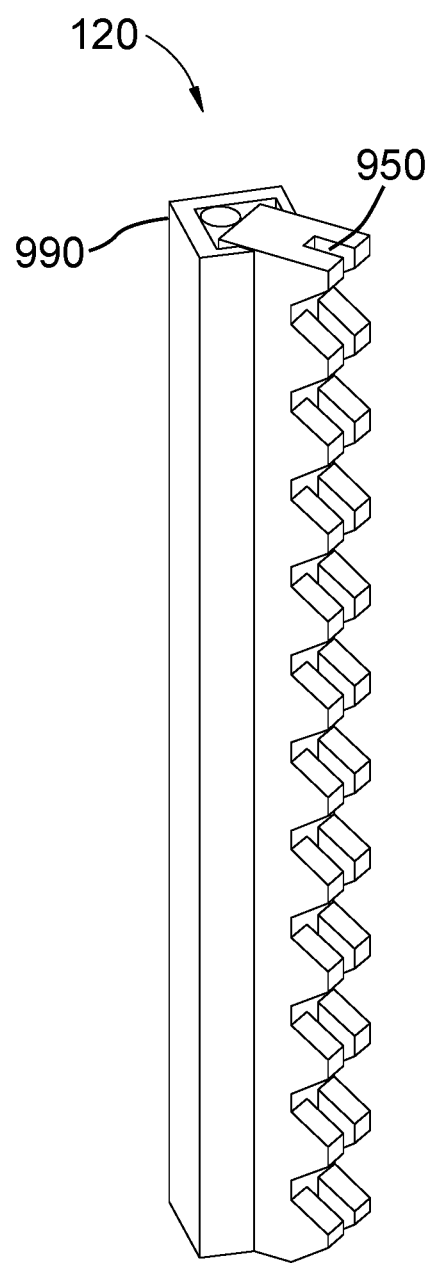

FIG. 9 depicts embodiments of the rack of the invention. A rack is a linear gear interface with a plurality of teeth. The rack of the invention has a profile that corresponds to and can engage with the profile of the silent chain of the invention. In one embodiment, the pitch of the rack measures between about 0.345 and 0.79 inches, preferably measuring between about 0.41 and 0.63 inches, more preferably measuring between about 0.48 and 0.58 inches. The pitch of the rack must be slightly bigger than the distance between central pivot points within each pin hole of the link plates of the silent chain in order for the profile of the rack to engage with the profile of the silent chain. In one embodiment, teeth of the rack extend from a main body of the rack at an angle between about 90 and 130 degrees, preferably at an angle between about 105 and 115 degrees. FIG. 9A depicts one embodiment of the rack 120 of the invention. The rack 120 has a truncated cubic configuration. One front face 960 has teeth, and parallel to the front face 960 is a point 970 where two back faces 980 join at a ninety-degree angle, such that the rack 120 can be placed in a corner. FIG. 9B depicts another embodiment of the rack 120. This embodiment has a cubic configuration but it can also be placed in a corner by being connected to a bracket 990 with a truncated cubic configuration. Because these embodiments of the rack can be placed in corners, it allows the whole rack and chain lifting device to be placed in corners. Rack and pinion devices generally are not placed in corners. That is because a motor extending out from the pinion is generally too large to fit in a space available within an angle of a corner. However, in the rack and chain lifting device, the silent chain engaging with the rack in place of a pinion engaging with a rack allows a motor to be distanced from the rack, as far away as the length of the silent chain allows. The combination of the silent chain together with the rack that can be placed in corners allows the rack and chain lifting device to be placed and utilized in corners. FIG. 9B also depicts one embodiment of the rack 120, in which the rack 120 has a center guide indentation 950 that corresponds with the center guide link plates of the silent chain, to prevent the silent chain from slipping when it engages with the rack.

Figures 10A, 10B:
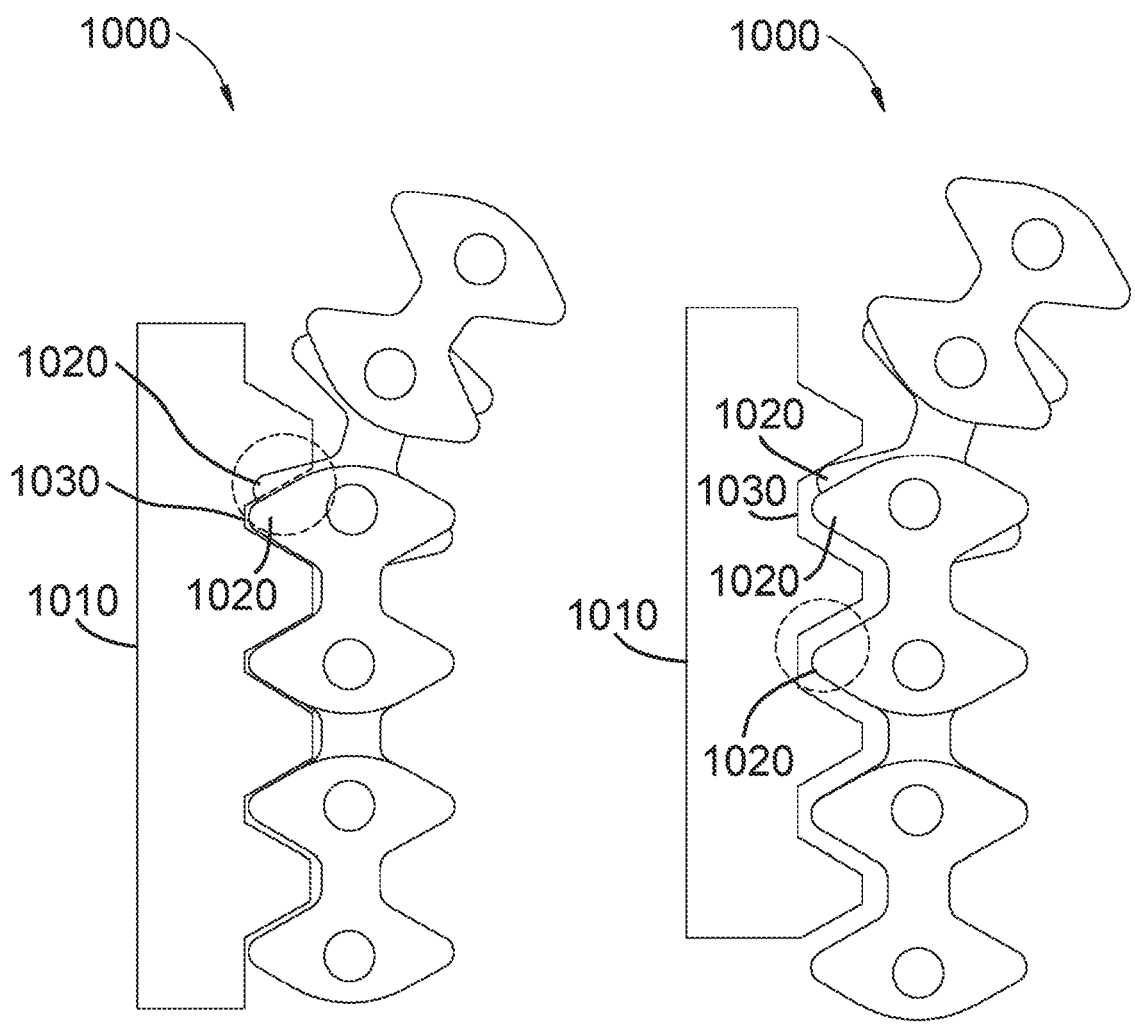
FIG. 10 depicts a perspective view of a prior art silent chain not engaging with a rack.

FIG. 10 depicts a prior art silent chain profile 1000 not engaging with a profile of a rack 1010. FIG. 10A demonstrates a problem that is encountered when trying to interface a prior art silent chain 1000 with a rack 1010. The circle in FIG. 10A draws attention to the area of problem. In a prior art silent chain 1000, as the silent chain 1000 is bent so that the teeth 1020 approach the rack 1010 to engage with the rack 1010, the teeth 1020 draw apart, such that they are offset. Because the teeth 1020 draw apart such that they are offset, the teeth become too big to fit within a groove 1030 of the rack 1010. Therefore, the teeth 1020 cannot fit within the groove 1030, and they cannot engage with the rack 1010. This problem could conceivably be corrected by increasing the size of the groove 1030 in the rack 1010. However, FIG. 10B depicts what happens when the size of the groove 1030 in the rack 1010 is increased. When the silent chain 1000 is bent, the teeth 1020 are drawn apart, such that they are offset. Because of the expanded size of the groove 1030 in the rack 1010, the teeth fit within the groove 1030 as the teeth approach the groove 1030. However, after the silent chain 1000 is straightened, the teeth 1020 align again. When the teeth 1020 align, they are too small to fit within the groove 1030. Consequently, the teeth 1020 are unable to engage with the rack 1010. In order to correct this problem, a silent chain profile is needed in which the teeth 1020 align as they are bent to approach the rack 1020, and in which the teeth 1020 are drawn apart such that they are offset when the silent chain 1000 is straightened.

Figure 11:
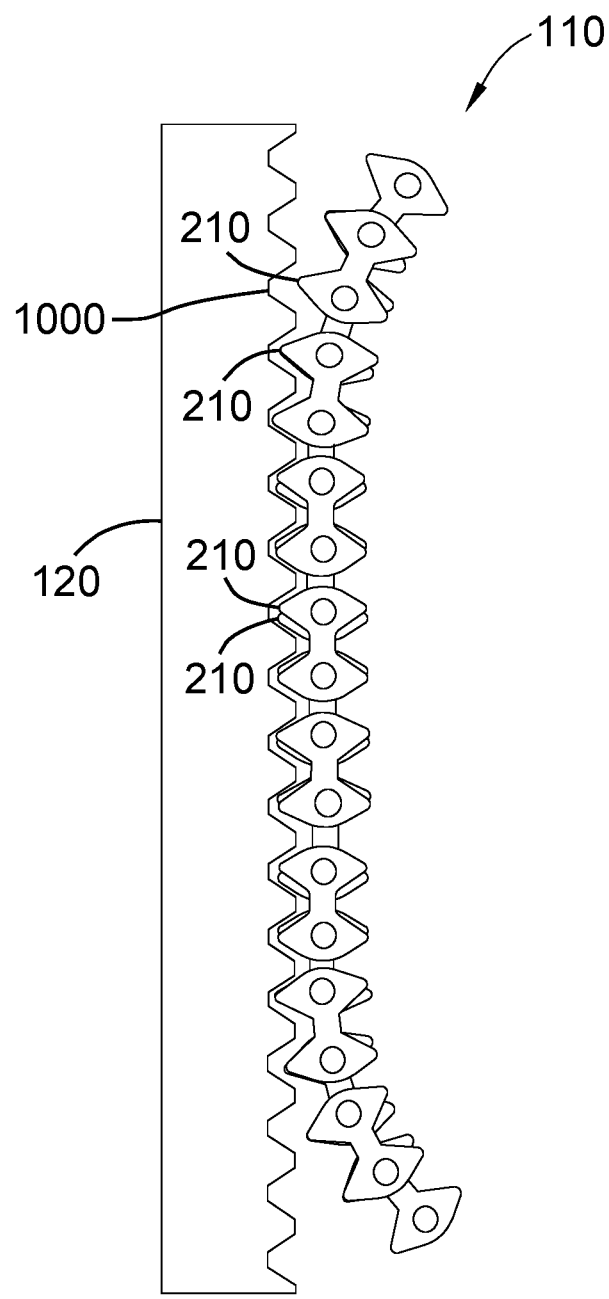
FIG. 11 depicts a perspective view of the silent chain of the invention engaging with the rack.

FIG. 11 depicts the profile of one embodiment of silent chain 110 built in accordance with the invention engaging with the profile of one embodiment of the rack 120. The profile of silent chain 110 corresponds with the profile of rack 120. The teeth 210 of the link plates of silent chain 110 are shaped in such a way that the teeth are offset when the silent chain 110 is straightened. However, as the silent chain 110 is bent so that the teeth 210 approach the rack 120 to engage with the rack 120, an upper portion of the teeth 210 align. Because the teeth 210 align, the teeth 210 become small enough to fit within a groove 1000 of the rack 120. After the silent chain 110 is straightened, the teeth 210 are drawn apart, such that they return to their original offset position. In this way, the teeth 210 are able to engage with rack 120.

Figure 12:
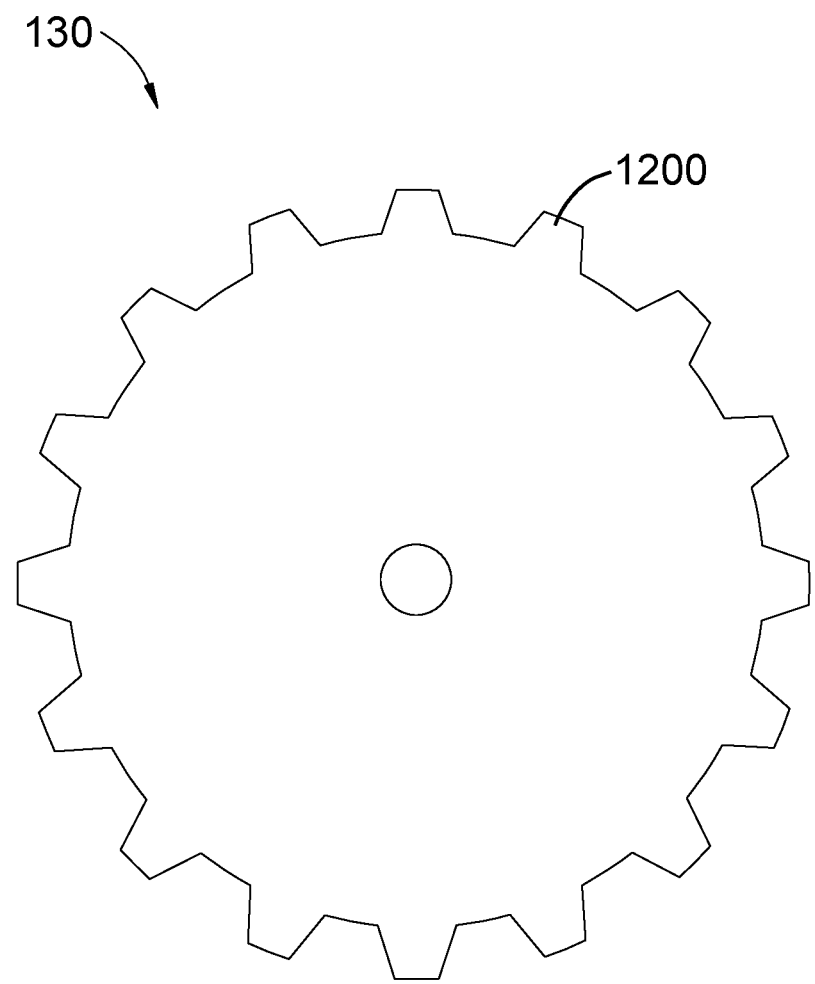
FIG. 12 depicts a perspective view of a gear.

FIG. 12 depicts one embodiment of a gear 130. Gear 130 has a profile that corresponds to the profile of the silent chain of the invention. In one embodiment, gear 130 comprises not less than twenty-one teeth 1200. Less than twenty-one teeth would make it impossible to accurately proportion both the amount of space necessary between the teeth for the teeth of the silent chain to fit and the pitch of the teeth necessary to allow the profile of the gear to correspond to and engage with the profile of the silent chain.

Figure 13:
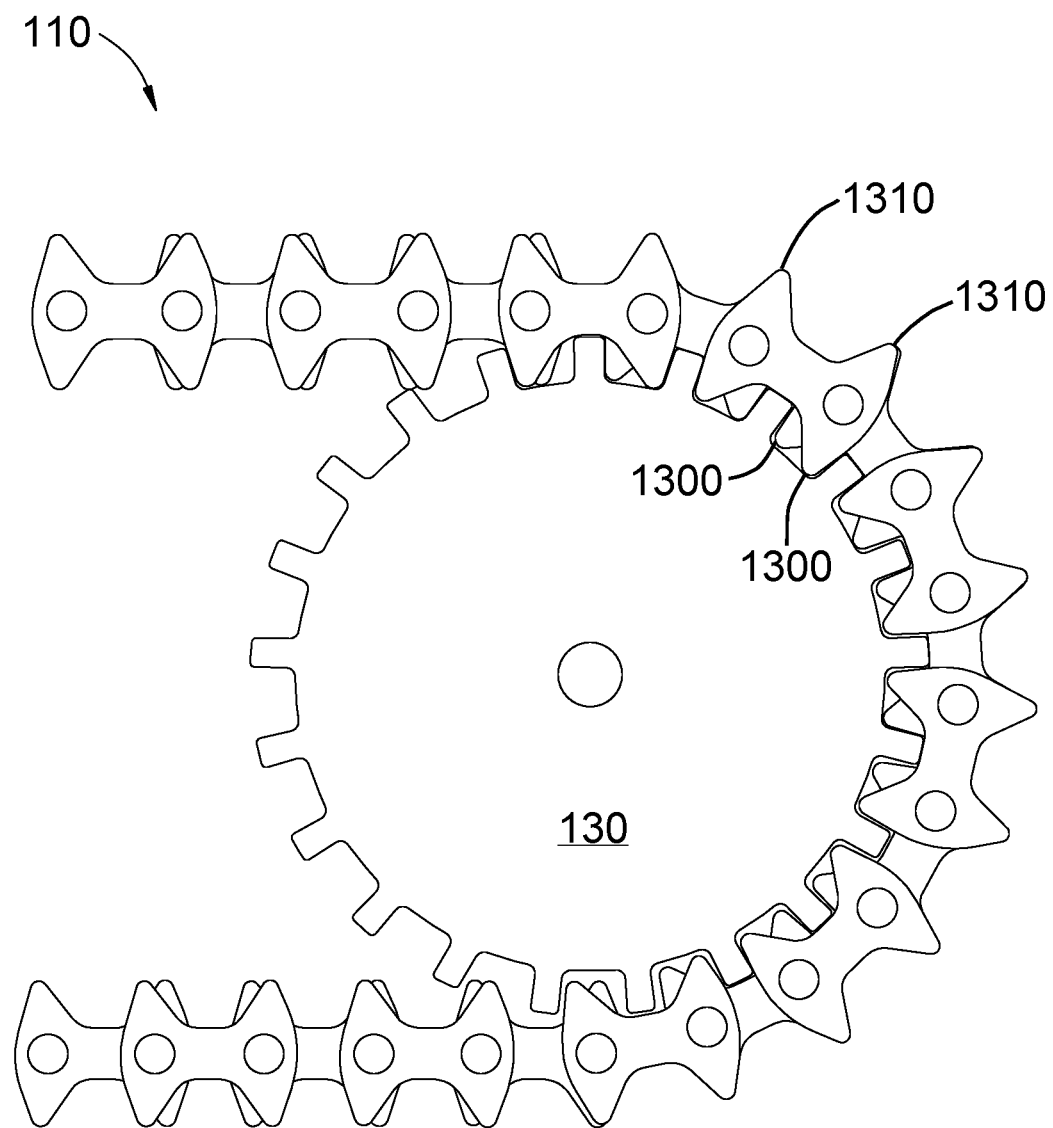
FIG. 13 depicts a perspective view of the silent chain of the invention engaging with a gear.

FIG. 13 depicts one embodiment of the silent chain 110 of the invention engaged with one embodiment of the gear 130. A profile of the gear 130 corresponds to the profile of the silent chain. The teeth of the link plates of the silent chain 110 are shaped in such a way that the teeth of each link plate are offset when the silent chain 110 is straightened. When the silent chain 110 is bent, lower teeth 1300 are drawn further apart, and so they continue to be offset. However, when the silent chain 110 is bent, upper teeth 1310 align, allowing them to engage with a rack. Still, because the lower teeth 1300, which are the teeth that engage with the gear 130, offset when the silent chain 110 is bent, the profile of the silent chain 110 corresponds to a profile of the gear 130, in just the way that prior art silent chains would.

Figure 14:
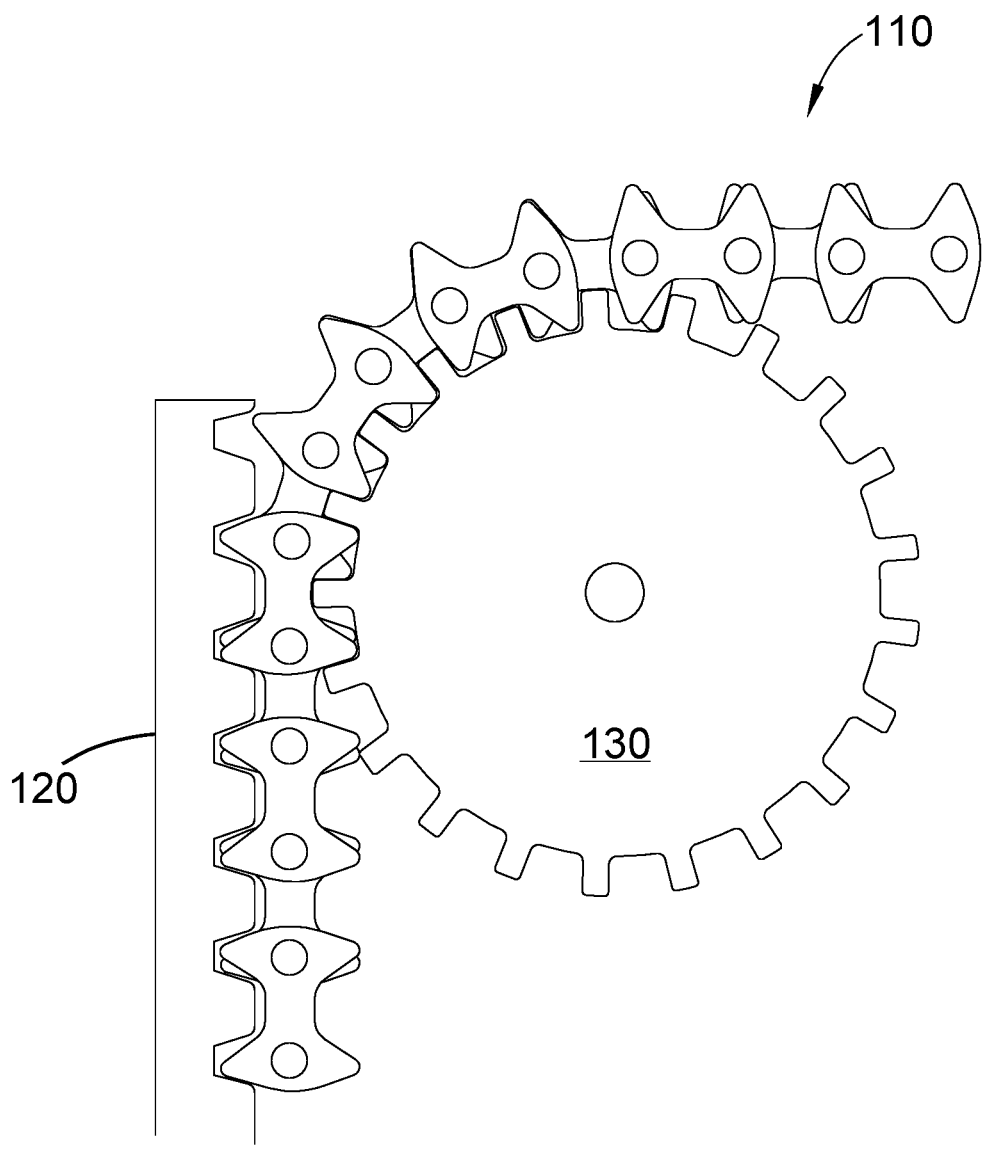
FIG. 14 depicts a perspective view of the silent chain of the invention engaging with both the rack and a gear.

FIG. 14 depicts one embodiment of the silent chain 110 of the invention engaging with both a profile of one embodiment of a gear 130 and a profile of one embodiment of a rack 120. Due to the profile of silent chain 110, in which the teeth of the link plates are offset when straightened, the silent chain 110 is able to engage with a gear 130 on the inside and a rack 120 on the outside at the same time. The gear 130 can be connected to a motor. In one embodiment, a motor drives gear 130 and the silent chain 110, such that the silent chain 110 can move up the rack 120, converting rotational motion into linear motion.

Figure 15:
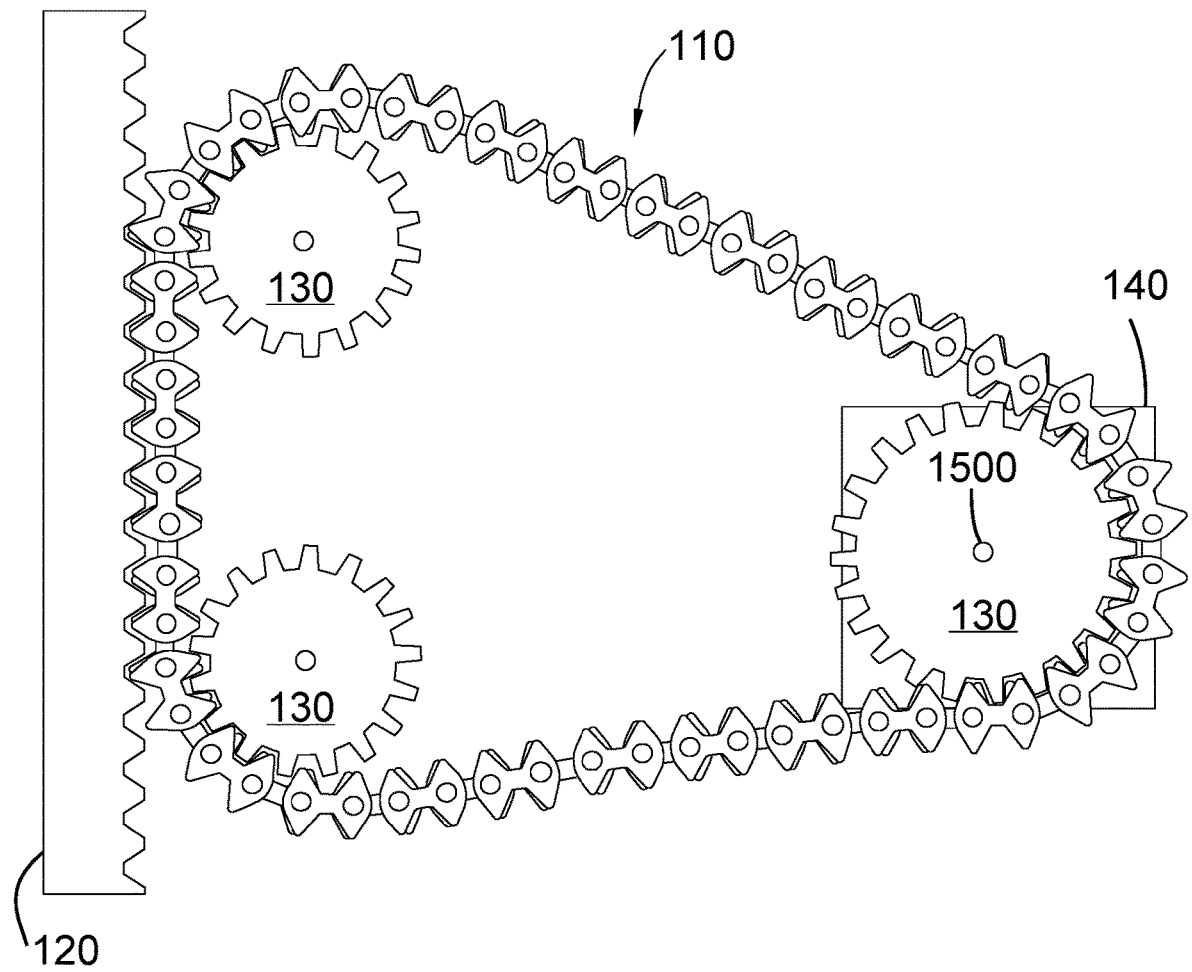
FIG. 15 depicts a perspective view of the rack and silent chain with gears and a motor.

FIG. 15 depicts embodiments of a silent chain 110, a rack 120, a plurality of gears 130, and a motor 140 assembled to create one embodiment of the rack and chain lifting device. The rack 120 and the gears 130 have profiles that correspond to the profile of the silent chain 110. The motor 140 is connected to and drives the gears 130 and the silent chain 110. In one embodiment, a shaft extending from the motor 140 is inserted through a middle hole 1500 of one gear 130, connecting the motor 140 to the gear 130. In one embodiment, a brake secures the motor 140 in place on the gear 130. At a distance from the first gear 130 that allows the silent chain 110 to stretch to its full extent, at least two other gears 130 are placed. The silent chain 110 is wrapped around each of the gears 130, and the teeth of the silent chain 110 engage with the teeth of the gears 130. The rack 120 is positioned vertically. The rack 120, the silent chain 110, the gears 130, and the motor 140 are positioned such that the portion of the silent chain 110 stretching between at least two gears 130, these gears being opposite the gear attached to the motor 140, can engage with the rack 120. The motor 140 and the gear 130 that is attached to it should be distanced from the rack 120 to the extent that allows the silent chain 110 to be fully extended.

Figure 16:
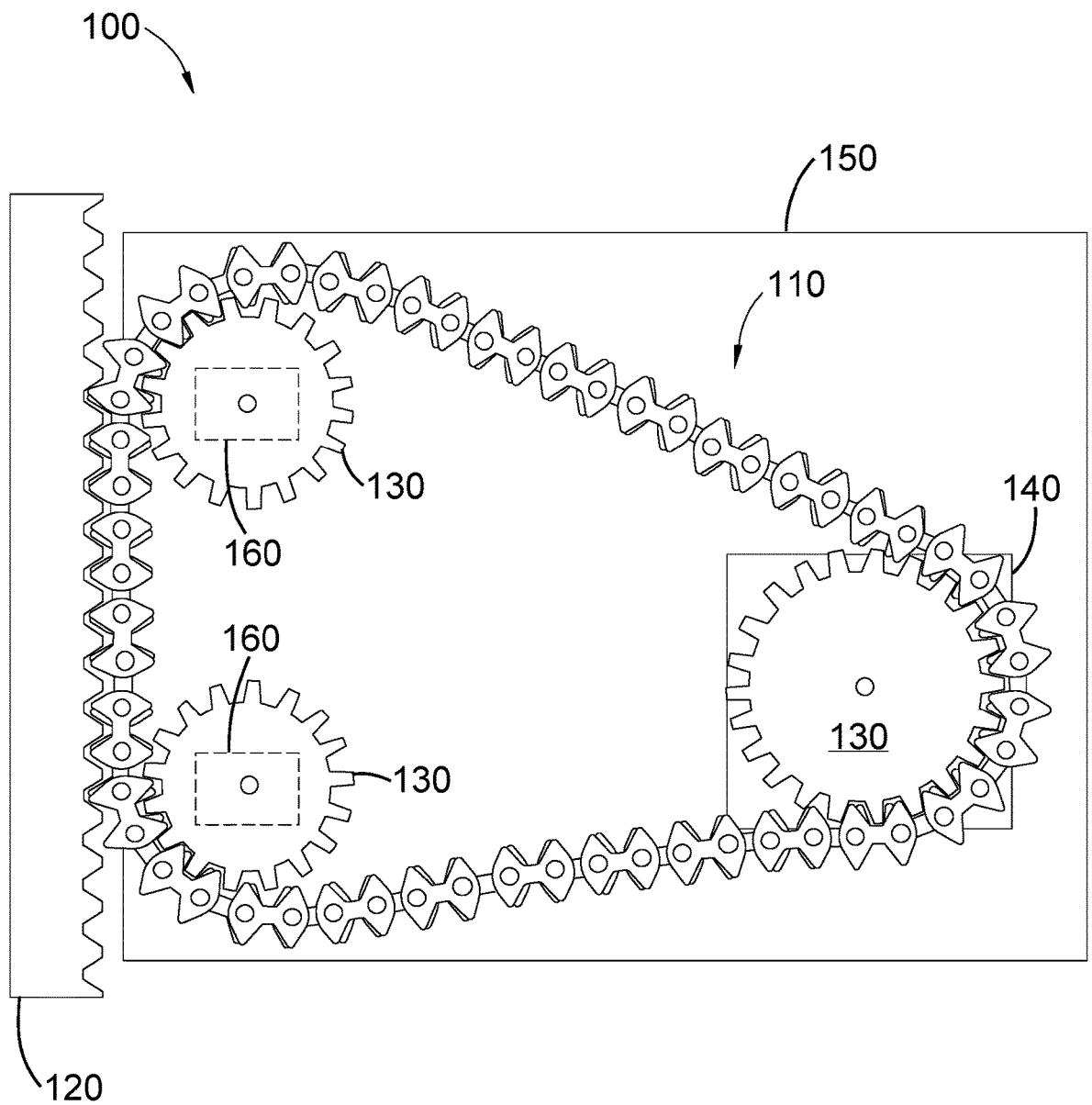
FIG. 16 depicts a perspective view of one embodiment of the rack and chain lifting device.

FIG. 16 depicts one embodiment of the rack and chain lifting device 100. The motor 140 and gears 130 are mounted on a mounting platform 150. The mounting platform 150 connects the rack and chain lifting device 100 to an item to be lifted. In one embodiment, the motor 140 and gears 130 are mounted on the mounting platform 150 in the following manner. Tensioners 160 are mounted on the mounting platform 150. The tensioners are used to stretch the silent chain 110 until it is taut and rigid. A shaft extends out from each tensioner 160. One gear 130 is fastened on the shaft extending out from each tensioner 160. Opposite these gears 130, at a distance that allows the silent chain 110 to stretch to its full extent, is a first gear 130 that is attached to the motor 140. The motor 140 is also mounted on the mounting platform 150 by being inserted and attached through a hole in the mounting platform 150. The silent chain 110 is fastened around the gears 130. The motor 140 drives the gears 130 and, therefore, the silent chain 110. When the silent chain 110 engages with the rack 120, the motor 140 drives the silent chain 110 up the rack 120, converting the rotational motion to linear motion.

Figure 17B:
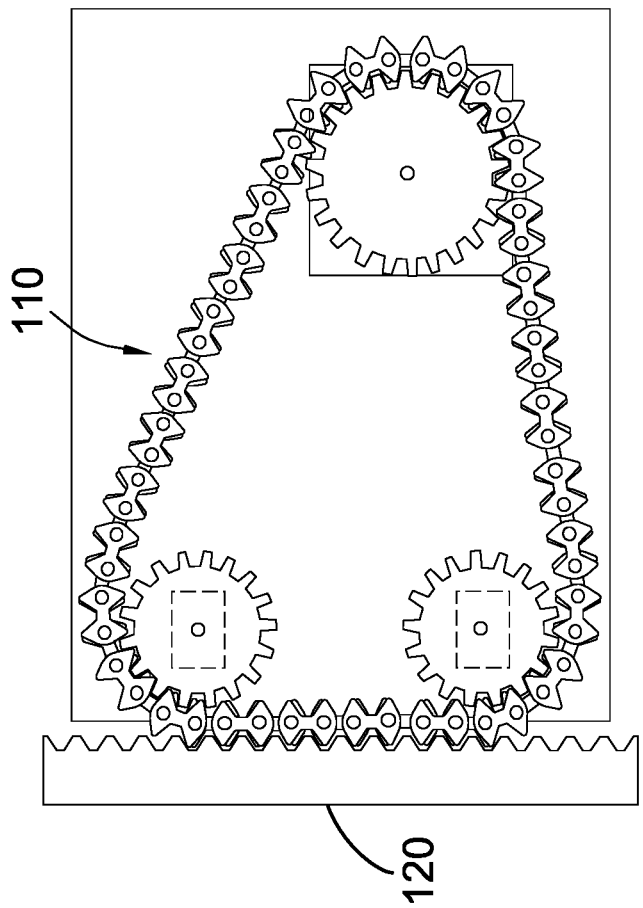
FIG. 17 depicts a perspective view of a comparison of points of contact between a rack and pinion device and points of contact between the rack and the silent chain in the rack and chain lifting device.
Figure 17A:
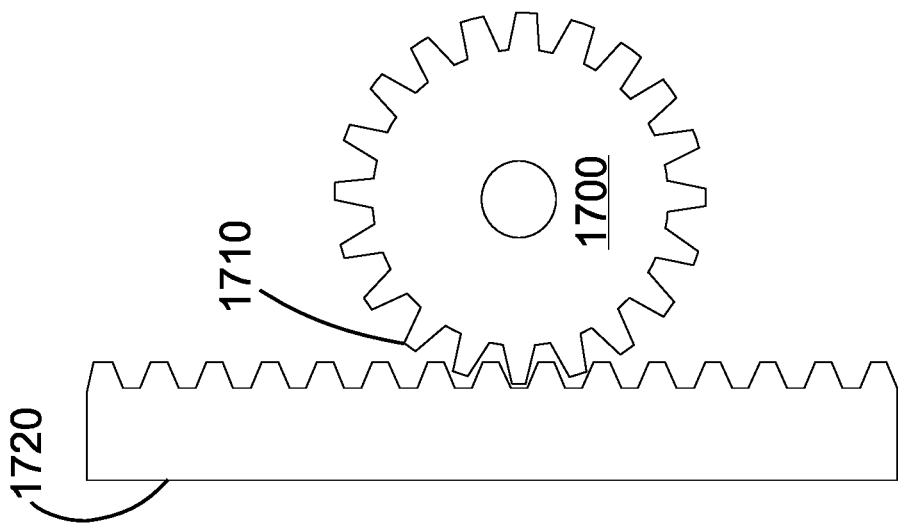

FIG. 17 depicts a comparison of points of contact between a rack and a pinion in a rack and pinion device and points of contact between a rack and the silent chain in a rack and chain lifting device. FIG. 17A depicts an ordinary rack and pinion device. Only a few teeth 1710 of the pinion 1700 make contact with the rack 1720. Due to the small number of points of contact, these points of contact may be put under undue amounts of stress when lifting heavy loads, which could cause the rack and pinion device to fail. On the other hand, FIG. 17B depicts the silent chain 110 of the invention engaged with a rack 120. In this case, multiple points of contact exist between the rack 120 and the silent chain 110. For this reason, the rack and silent chain device is stronger and able to hold more weight. In addition, only small parts are needed, thus increasing the efficiency and decreasing the cost of lifting heavy loads from underneath.

FIG. 18 depicts a comparison between a rack and pinion device in a corner and the rack and chain lifting device in a corner. FIG. 18A depicts a rack and pinion device 1800 in a corner. Rack and pinion devices generally are not placed in corners because a motor 1810 extending out from the pinion 1820 is generally too large to fit in a space available within an angle of a corner. This problem could be solved by adding gears between the rack and the pinion, but that would increase cost and reduce efficiency. FIG. 18B depicts a rack and chain lifting device 100 in a corner. In the rack and chain lifting device 100, the silent chain 110 engaging with the rack 120, in place of a pinion engaging with a rack, allows a motor 140 to be distanced from the rack 120, as far away as the length of the silent chain 110 allows. This allows the rack and chain lifting device 100 to be placed and utilized in corners.

The invention claimed is:
1. A rack and chain lifting device comprising:
a linear rack having a first tooth profile;
a first circular gear that is away from the linear rack, wherein the first circular gear has a second tooth profile;
a second circular gear that is proximal to the linear rack, wherein the second circular gear has the second tooth profile;
a third circular gear that is proximal to the linear rack, wherein the third circular gear has the second tooth profile, wherein the second tooth profile is different than the first tooth profile;
a motor, the motor connected to and driving the first circular gear; and
a silent chain, the silent chain comprising a plurality of first and second connecting pins and a plurality of link plates, wherein each link plate has four teeth with two upper teeth extending in a direction normal to a direction of travel of the link plate and two lower teeth extending in a direction anti-normal to the direction of travel, wherein each tooth comprises a tip having a central point, and wherein each link plate has first and second pin holes each comprising a central pivot point spaced apart parallel to the direction of travel, wherein the respective central points are spaced apart at a first distance and the respective central pivot points are spaced apart at a second distance that is different than the first distance;

wherein the plurality of link plates are stacked in first and second alternating rows and bendably joined together by inserting the first and second connecting pins through the first and second pin holes, such that the first connecting pins pass through the first pin hole of the link plates of the first row and pass through the second pin hole of the link plates of the second row, and such that the second connecting pins pass through the second pin hole of the link plates of the first row and pass through the first pin hole of the link plates of the second row, and wherein the first and second distances of the respective central points and the respective central pivot points cause a first lower tooth of the first row of link plates and a second lower tooth of the second row of link plates to be offset in a first offset corresponding to the first tooth profile when the silent chain is engaged with the linear rack and cause a first lower tooth of a first link plate in the second row of link plates to align with a second lower tooth of a second link plate in the first row of link plates and a second lower tooth of the first link plate in the second row of link plates to align with a first lower tooth of a third link plate in the first row of link plates when the second link plate in the first row of link plates is engaged with the linear rack and the third link plate in the first row of link plates is engaged with one of the second circular gear and the third circular gear.

2. The rack and chain lifting device of claim 1, wherein each tip forms an angle between about 30 and 80 degrees.

3. The rack and chain lifting device of claim 1, wherein each tip forms an angle between about 55 and 60 degrees.

4. The rack and chain lifting device of claim 1, wherein each tooth extends from a vertical waist of each link plate at an angle between about 100 and 150 degrees.

5. The rack and chain lifting device of claim 1, wherein each tooth extends from a vertical waist of each link plate at an angle between about 125 and 130 degrees.

6. The rack and chain lifting device of claim 1, wherein the first distance between central pivot points within each pin hole of each link plate measures 0.5 inches, and the second distance between central points of two teeth of the link plate that are pointing a same direction measures between about 0.345 and 0.790 inches.

7. The rack and chain lifting device of claim 1, wherein the first distance measures 0.5 inches, and the second distance measures between 0.490 and 0.680 inches.

8. The rack and chain lifting device of claim 1, wherein the first distance measures 0.5 inches, and the second distance measures between 0.550 and 0.645 inches.

9. The rack and chain lifting device of claim 1, the silent chain further comprising center guide link plates, the center guide link plates being positioned centrally between the alternating first and second rows of link plates, and the center guide link plates being stadium-shaped and having no teeth.

10. The rack and chain lifting device of claim 1, wherein the first and second connecting pins are rocker pins.

11. The rack and chain lifting device of claim 1, wherein the silent chain comprises eight alternating rows of link plates.

12. The rack and chain lifting device of claim 1, wherein a pitch measurement of the linear rack measures between 0.345 and 0.79 inches.

13. The rack and chain lifting device of claim 1, wherein a pitch measurement of the linear rack measures between 0.41 and 0.63 inches.

14. The rack and chain lifting device of claim 1, wherein a pitch measurement of the linear rack measures between 0.48 and 0.58 inches.

15. The rack and chain lifting device of claim 1, wherein teeth of the linear rack extend from a main body of the linear rack at an angle between 90 and 130 degrees.

16. The rack and chain lifting device of claim 1, wherein teeth of the linear rack extend from a main body of the linear rack at an angle between 105 and 115 degrees.

17. The rack and chain lifting device of claim 9, wherein the linear rack has a center guide indentation that corresponds with the center guide link plates of the silent chain, to prevent the silent chain from slipping when it engages with the linear rack.

18. The rack and chain lifting device of claim 1, further comprising a mounting platform, on which the motor and the first, second, and third circular gears are mounted.

* * * * *